Aug. 31, 1937.     B. V. SZABO     2,091,618
VALVE AND FAUCET
Filed Dec. 31, 1931     2 Sheets-Sheet 2
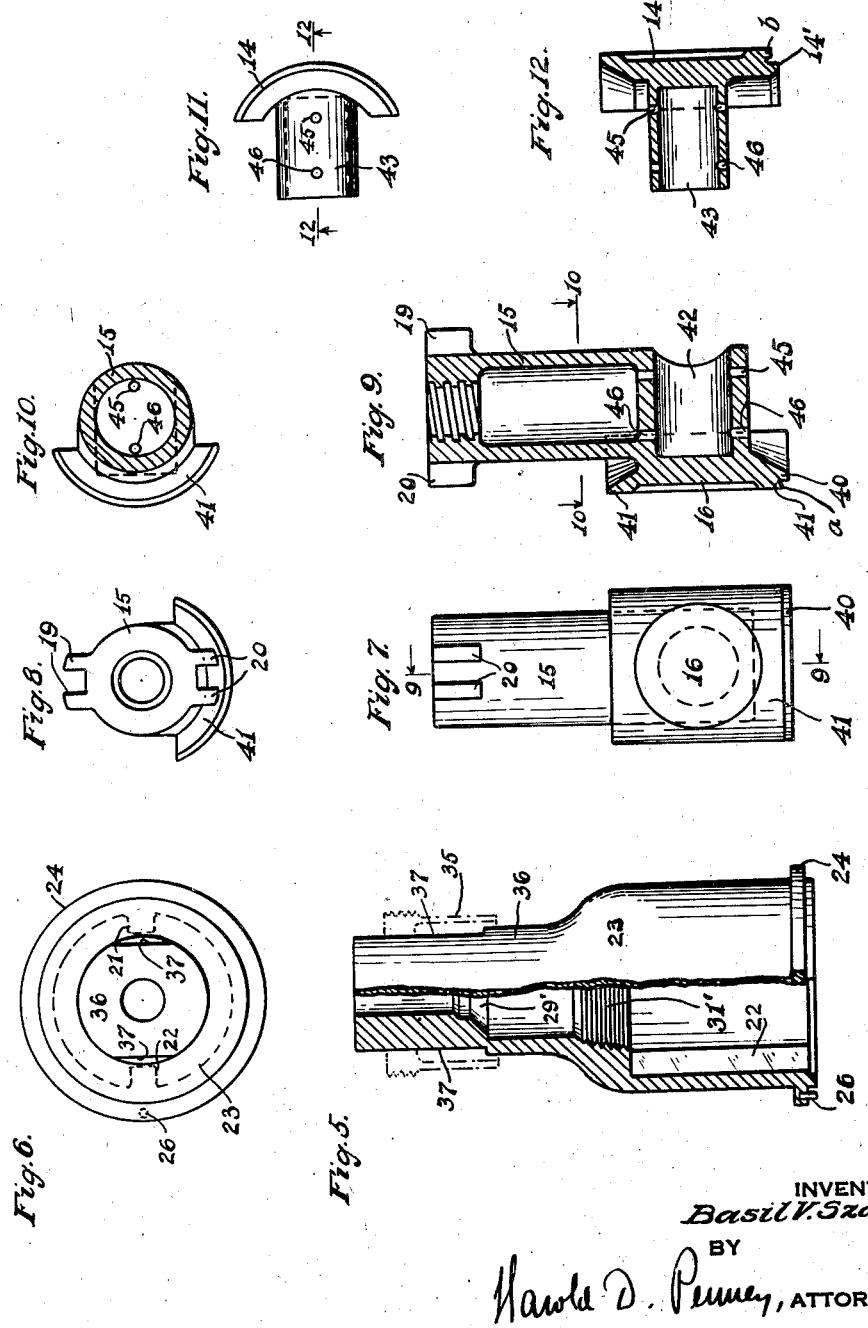
INVENTOR,
Basil V. Szabo,
BY
Harold D. Penney, ATTORNEY Patented Aug. 31, 1937

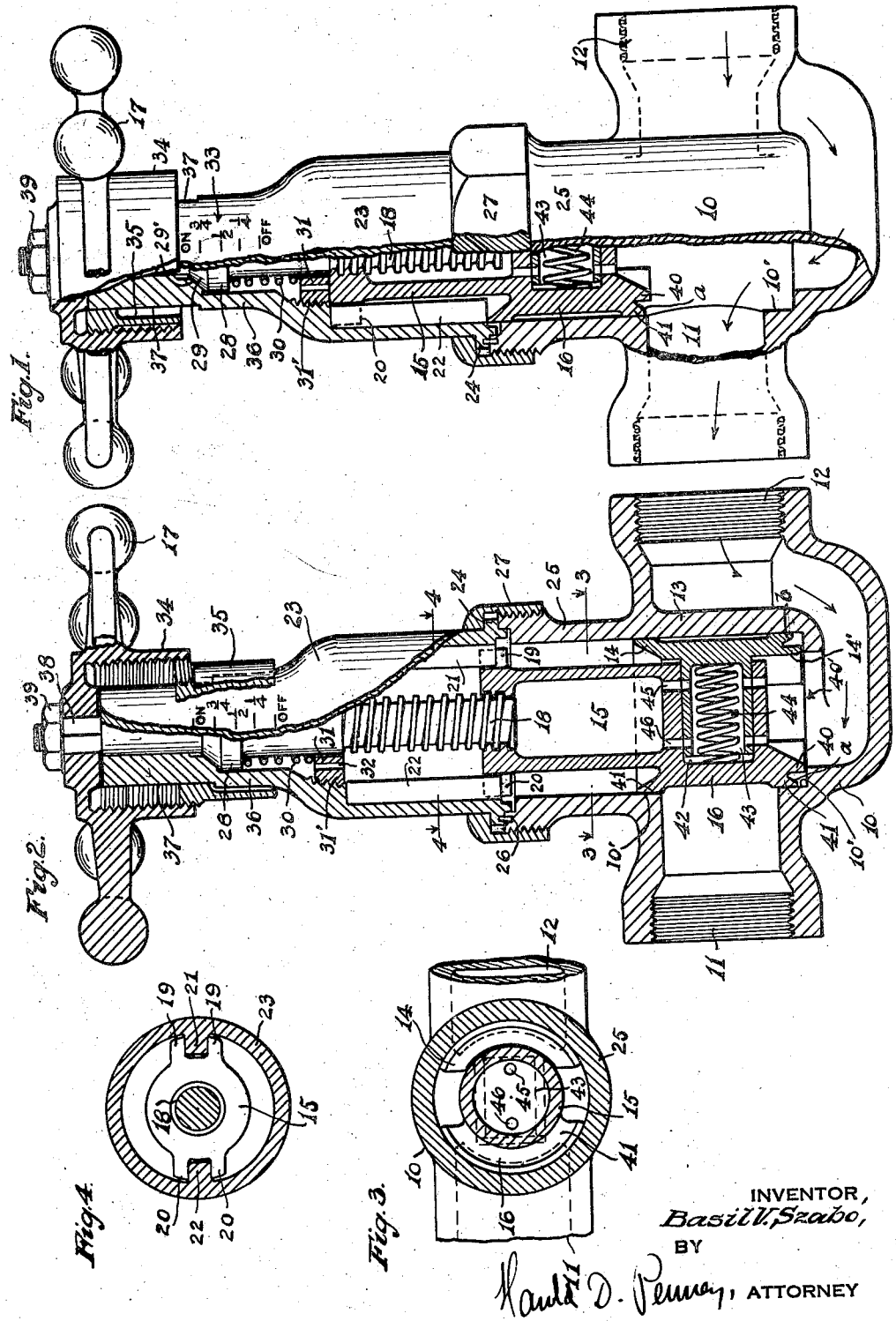

2,091,618

UNITED STATES PATENT OFFICE 2,091,618

VALVE AND FAUCET

Basil V. Szabo, New York, N. Y.

Application December 31, 1931, Serial No. 584,040

1 Claim. (Cl. 251—65)

This invention relates to valve or faucet devices and has for one of its objects the provision of an organization in which the constituent elements are so coordinated structurally and functionally as to secure improved results with inexpensive material which may always remain in effective working condition, there being no renewable parts, such as leak-proof gaskets or packings, in the structure.

The valve controls movement of liquid, such as water, gas, or steam, in a pipe or conduit, and as it is often desirable to know the position of the valve relative to its seat or opening, at a glance the present structure includes a dial or graduated valve-opening indicating index means, under operative control of the valve manipulating means to exteriorly show the position of the inner or closure parts of the valve. With this index means the operative position of the valve is quickly apprehended, without touching the valve.

This latter feature is particularly useful in the supervision of a number of installed valves wherein the positions of said valves may be visually checked as to their proper settings.

Since the cut-off valve or closure portion is disposed in the valve passage of or in the path of movement of the fluid; and is also movable into or out of the said path, a further important object of the invention is to so construct the cut-off valve that, during its movement, the liquid pressures may be effective, to seal the valve, when closed. As shall hereinafter appear, the cut-off valve portions comprise spaced segments, which are relatively expansible, and the fluid pressure acts to expand the segments to seat them against leakage.

As the fluid moves under pressure, and as it is desirable to present a large surface of the inner portions of the segments to the moving fluid, a still further object of the invention is to so construct the said surfaces as to present a maximum of sealing area to the action of the fluid pressure.

A further object is to provide the valve seat and cut-off or valve portions with coacting edges and ledges, so that when the duct is closed by the valve cut-off, it is firmly pressed against the said ledge portions.

A further object is to provide the valve cut-off with a seat cleaning means, whereby closing the valve will clear the seat portion of all particles which tend to prevent proper closure, and which when the valve is opened will permit such particles to be carried away by the passing fluid stream.

Other objects and advantages will hereinafter appear.

In the accompanying drawings:

Fig. 1 is a lateral elevational view of my improved valve, partly broken away and in section.

Fig. 2 is a vertical central sectional view, in which some of the parts are shown in positions differing from those of Fig. 1.

Fig. 3 is a horizontal section taken on the line 3—3 of Fig. 2.

Fig. 4 is a horizontal section taken on the line 4—4 of Fig. 2.

Fig. 5 is a fragmentary view of a casing section.

Fig. 6 is a top plan view of a portion of the valve.

Fig. 7 is an elevational view of a valve stem section.

Fig. 8 is a top plan view of the structure shown in Fig. 7.

Fig. 9 is a sectional detail view of a valve section.

Fig. 10 is a horizontal sectional view taken on the line 10—10 of Fig. 9.

Fig. 11 is a plan view of a valve segment;

Fig. 12 is a horizontal sectional view taken on the line 12—12 of Fig. 11.

Similar characters of reference designate corresponding parts throughout the several views.

The device includes an outer composite casing, including a base portion 10, the opposite openings 11, 12, of which form a duct or passage, and are threaded to receive any threaded pipe or conduit connections. Disposed in these ducts, which form the passageway of the line, is a partition 13 which directs the fluid downwardly to the valve opening, and against the inner cylindrical face of which partition a relatively movable valve guide segment 14 carried by the movable base valve assembly 15, is slidable, best shown in Fig. 2. This section includes a port closing valve segment 16, which is preferably resiliently disposed opposite said first guide segment. The casing portion 10 forms a section of the pipe line.

Cooperating with the axially movable valve body extension 15 is a revolvable top section, Fig. 2, which includes a hand wheel 17 and a threaded stem portion 18. Turning movement of the hand wheel moves the valve section 15 between open and closed positions, shown in Figs. 1 and 2, there being on said section opposed pairs of integral guiding flange projections 19, 20, which are movable along guide ribs 21, 22 which are integral with the body extension 23.

This latter extension, which includes an integral seating flange 24, finds a seat on the lower casing or base 25; and as said base has therein a suitable aperture to receive a dowel pin 26 located in flange 24, the structures are registered and held against turning movement while the hand wheel is revolved. The inner faces of the body forming portions 23 and 25 are disposed in flush relation, and are coupled in fluid tight assembly by an internally threaded coupling nut or union 27, which is hexed to permit the use of a wrench, and engages with suitable threads on the lower casing portion 25.

It will be noted, by referring to Fig. 2, that the valve segments 14 and 16 are provided at their lower edges with a relief channel thus leaving clean edges 40 and 14', Figs. 2, 9 and 12. These edges cooperate with the lower stop seat or valve abutting shoulder 40' located at the terminus of the valve stroke in the body portion 25.

This abutting shoulder or ledge 40' is truly machined as are also the lower edges 40—14' of the valve segments 14—16, so that when the valve is closed, the said edges press firmly on said seat or ledge 40' in a fluid tight manner and thus, especially as to valve segment 16, prevent leakage through the port when the valve is closed.

During the closing movement of the valve the segments 14—16, by reason of the champfered lower edges a—b, Figs. 1, 2, 9 and 12, tend to scrape the cylindrical faces 10' clear of deposited material, and thus carry all such material down into the channel formed between the edges a and 40 and the edges 14' and b. The material is thus removed by the flowing fluid stream when the valve is opened and thus the active valve faces or seats, as 10', which cooperate with the face or seat 41 of the segment 16 and the corresponding face of the segment 14, are kept clean.

The stem 18 has thereon an annular shoulder 28, the tapered face 29 of which finds a seat on a correspondingly tapered seat 29' of the casing extension 23; and a spring 30, terminally seated between the threaded support collar 31 and the shoulder 28, presses the latter upwardly, said surfaces are held in rotatable, liquid tight relation. The collar 31, which is provided with apertures, as at 32, to receive a spanner wrench, is held by the threaded bore 31' in said extension 23.

In order to quickly and visually ascertain, from the exterior, the extent to which the valve is open or closed, the body extension 23 is provided with indicia 33, in the present instance shown as graduation marks, figures, and the words "on" and "off". The hand wheel is provided with a keyed or internally threaded cylindrical collar 34, which engages the external threads of a reciprocable index collar 35, and as the latter, as well as the neck 36 of the portion 23, are provided with associate flatted portions 37, Figs. 5 and 6, said index collar is slidably movable to cooperate with the aforesaid indicating marks, as is clearly visible from an inspection of Figs. 1 and 2. The hand wheel is retained on a terminally threaded angular tang 38 of the stem by a nut 39, as in Fig. 2.

Pressure of water or fluid in the line acts against the inner faces of both segments and tightly hold the outer face of the cut-off segment 16, against the cylindrical face 10' of the valve duct casing 10, in any position of the valve. As said segment 16 has the lower flange valve 40, which is provided with inclined surface, as shown, this provides an enlarged area against which the fluid pressure in the line, exerts a pressure to hold the valve structure securely expanded against the inner face of the casing 25.

The reversely facing portion of the valve segment 14 is structurally, like that of the port cut-off segment 16. The segment 16 has a bore 42, Figs. 2 and 9, and in the latter is slidably disposed a bushing 43 of the segment 14. A spring 44 between the opposed valve segments gives the segments an initial expanding movement, but the reaction of the spring is so arranged as to permit axial sliding movement of the segments, during rotation of the valve stem. Said bushing and valve segment portions may have therein pressure equalizing registering openings as at 45, 46, to allow fluid pressures to be exerted above in the chamber of extension 15, as well as below the valve cut-off segments.

The valve is constructed of rust proof material; and no packings or gaskets are used, so that the device may last indefinitely without renewal of parts.

What I claim is:

A valve comprising a casing having a longitudinal passage and a lateral passage; a partition between the lateral passage and one end of the longitudinal passage and provided with a vertical wall and a bottom wall having a lower opening and a horizontal seat surrounding the opening; a vertical seat between said lateral passage and the other end of the longitudinal passage; a movable element having valve segments respectively conformably yieldably engageable with said vertical wall and vertical seat and each having a lower edge accurately fitting said horizontal seat; and means for sliding said element and segments away from said seats.

BASIL V. SZABO.